United States Patent [19]
Wilhelm et al.

[11] Patent Number: 5,183,974
[45] Date of Patent: Feb. 2, 1993

[54] GAS PULSATION ATTENUATOR FOR AUTOMOTIVE AIR CONDITIONING COMPRESSOR

[75] Inventors: Richard D. Wilhelm, Amherst; Nikolaos A. Adonakis, Grand Island, both of N.Y.

[73] Assignee: General Motors Corporation, Detroit, Mich.

[21] Appl. No.: 862,706

[22] Filed: Apr. 3, 1992

[51] Int. Cl.⁵ .............................................. F01N 1/00
[52] U.S. Cl. .................................... 181/0.5; 181/249; 181/255; 181/269; 181/271; 417/312
[58] Field of Search ............... 181/212, 249, 246, 255, 181/269, 271, 0.5; 417/312

[56] References Cited
U.S. PATENT DOCUMENTS

| | | | |
|---|---|---|---|
| 3,766,992 | 10/1973 | Tiraspolsky et al. | 175/25 |
| 3,874,417 | 4/1975 | Clay | 138/30 |
| 4,611,633 | 9/1986 | Buchholz et al. | 181/255 |
| 4,934,482 | 6/1990 | Herron et al. | 181/224 |
| 4,936,383 | 6/1990 | Towner et al. | 166/68 |
| 5,094,271 | 3/1992 | Fritz et al. | 181/255 |
| 5,129,793 | 7/1992 | Blass et al. | 417/312 |

*Primary Examiner*—J. Woodrow Eldred
*Attorney, Agent, or Firm*—Ronald L. Phillips

[57] ABSTRACT

An attenuator for pressure and sound energy pulsations, such as are commonly produced in refrigerant gas discharged from a piston-type refrigerant compressor, is provided. The attenuator includes an annular elastomeric body supported by a rigid tubular housing. The body forms a cavity filled with a damping fluid and annular dividers define multiple chambers that are concentrically disposed about a central refrigerant gas flow passage. Damping tracks are provided in the dividers to allow fluid flow between the chambers. As refrigerant gas flows through the passage, the pressure/sound pulsations are flattened and smoothed. The resilient walls of the body are designed to bulge inwardly for a maximum 50% restriction. Gas flow orifices of the dividers have substantially the same cross-sectional area as the refrigerant line.

4 Claims, 3 Drawing Sheets

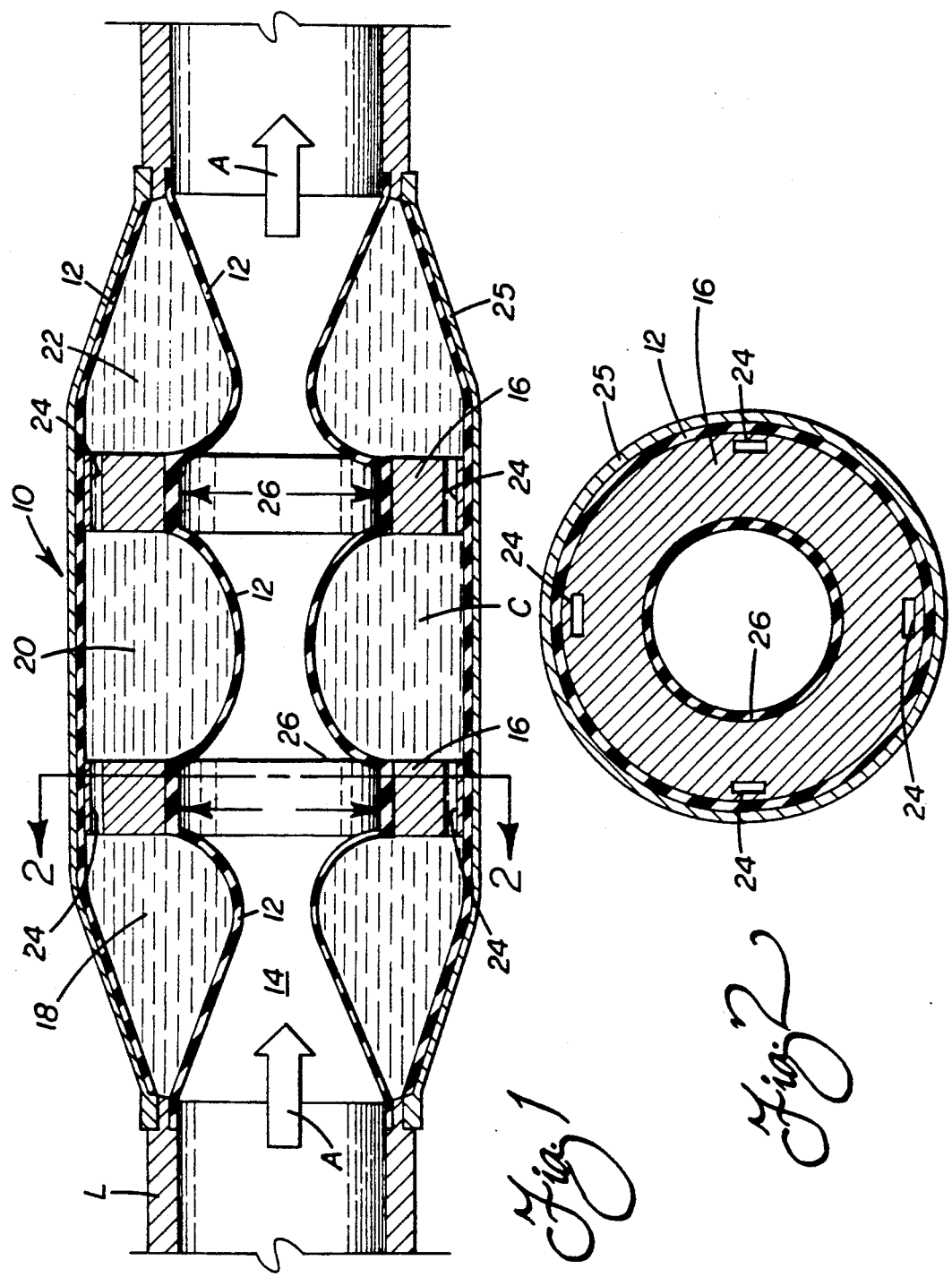

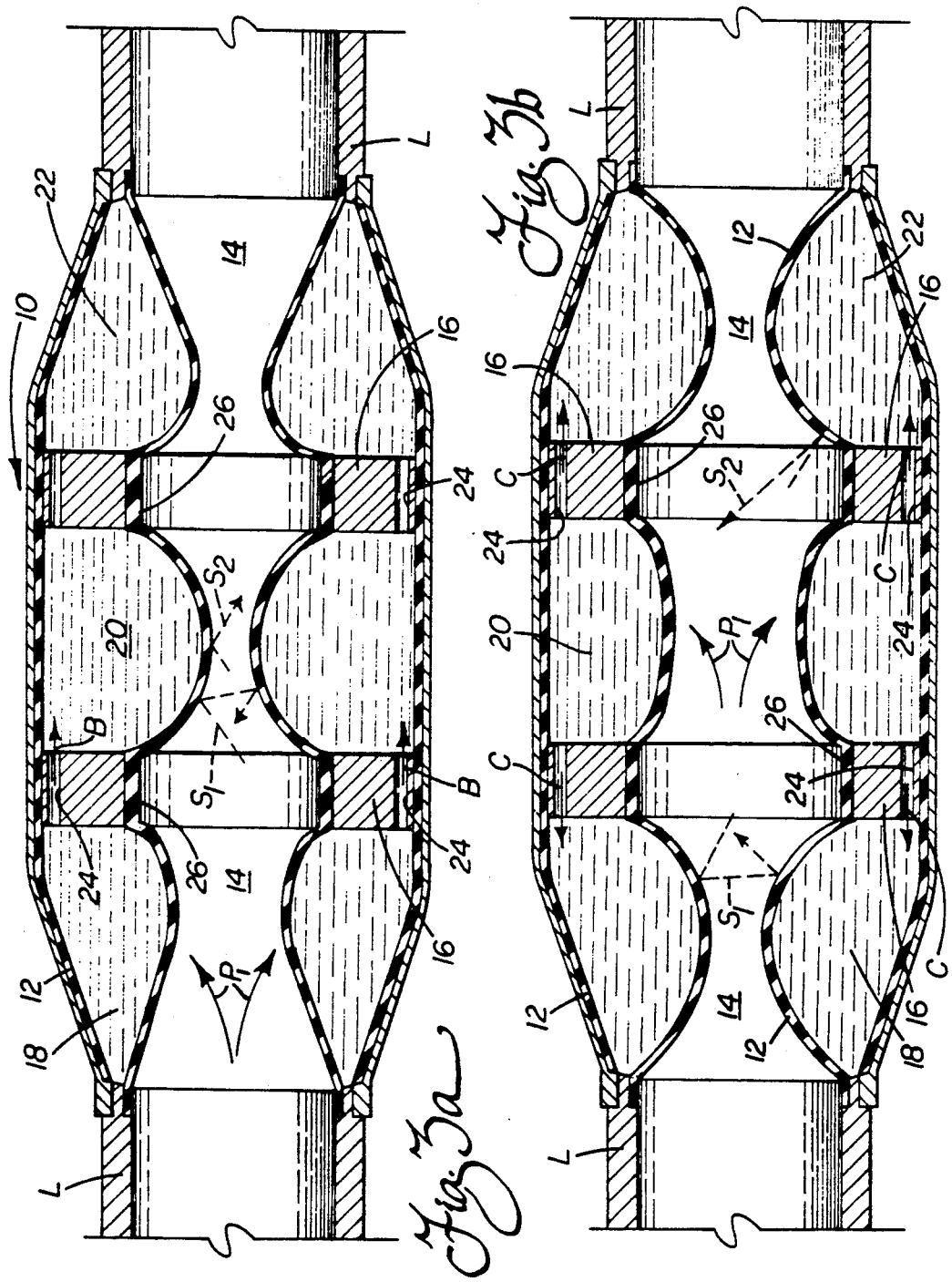

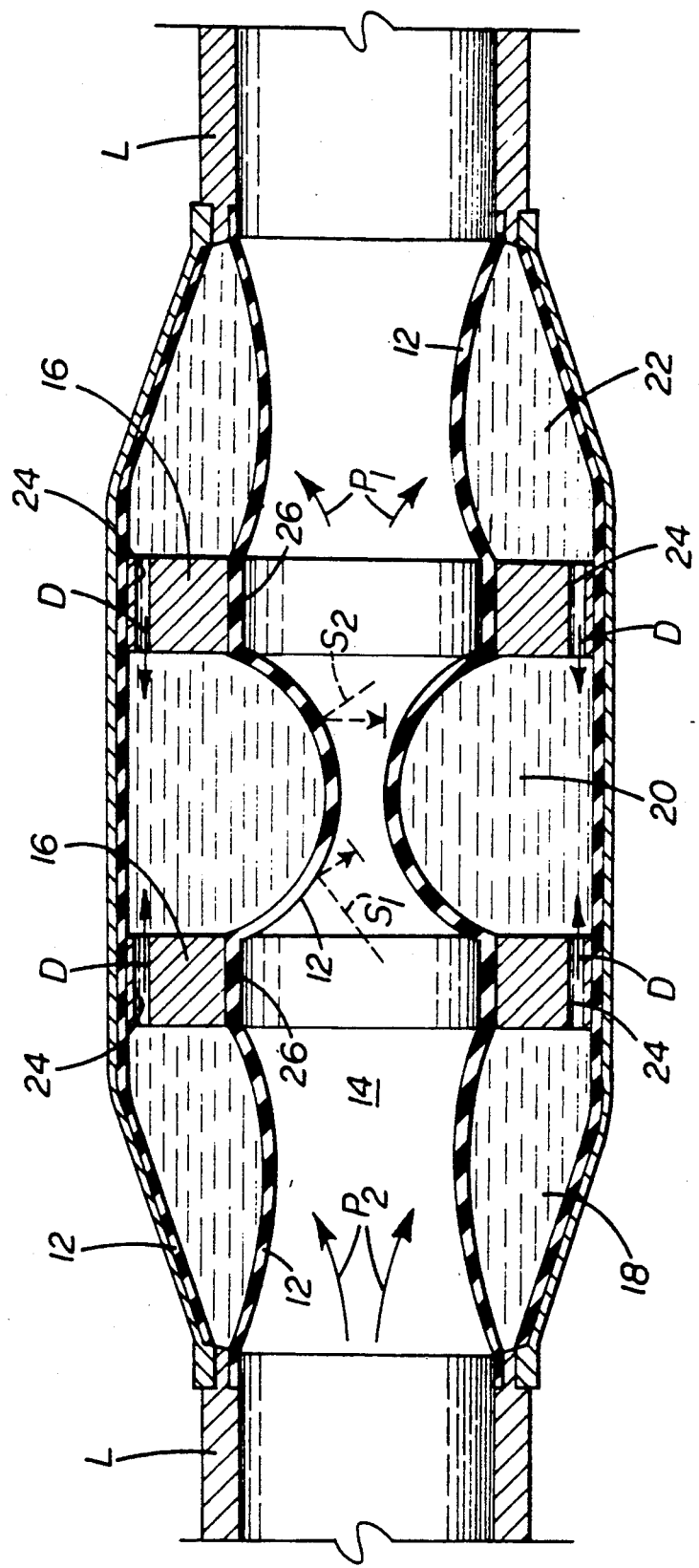

GAS PULSATION ATTENUATOR FOR AUTOMOTIVE AIR CONDITIONING COMPRESSOR

TECHNICAL FIELD

The present invention relates to pulsation attenuators of the type utilized to smooth the operation of a refrigerant compressor and, more particularly, to an attenuator for dampening pressure and sound energy pulses in a piston-type compressor commonly used in a vehicle air conditioning system.

BACKGROUND OF THE INVENTION

A variety of refrigerant compressors for use in vehicle air conditioning systems are currently available. Two of the more popular vehicle compressor designs are the variable capacity axial type and the radial type, both of which use a series of pistons operating in an array of cylinders to compress the refrigerant gas.

In a wobble plate axial type compressor, the cylinders are equally, angularly spaced about and equally radially spaced from the axis of a central drive shaft. A piston is mounted for reciprocal sliding motion in each of the cylinders. Each piston is connected to a non-rotary swash plate or wobble plate received about and operatively connected to the drive shaft through a rotary drive plate.

During operation of the compressor, rotation of the drive shaft and drive plate imparts a wave-like reciprocating motion to the wobble plate. This driving of the wobble plate in a nutating path serves to impart a linear reciprocating motion to the pistons. By varying the angle of the wobble plate and drive plate relative to the drive shaft, the displacement or capacity of the compressor may be varied to effect the desired level of compressing action. The discharge from the cylinders is mixed in a discharge chamber in the housing, and to some extent pressure/sound energy pulsations are attenuated by the mixing action. An axial compressor of this type is disclosed in, for example, U.S. Pat. No. 4,428,718 to Skinner, entitled "Variable Displacement Compressor Control Valve Arrangement", issued Jan. 31, 1984, and assigned to the assignee of the present invention.

In a radial type compressor, a cylinder block is provided having an array of radially arranged cylinders. Each cylinder defines a piston receiving bore that is closed by a discharge valve assembly. A piston is positioned for reciprocation in each bore and driven by a crank shaft operatively connected to the engine of the vehicle. This compressor includes an annular discharge chamber defined between the periphery of the cylinder block and an outer cylindrical shell, which also tends to smooth out the inherent pulsations.

The radial type compressor is relatively compact and lightweight when compared to the wobble plate axial type compressor. This is because the radially extending pistons allow the compressor to be made with a minimal axial length. Accordingly, the compressor housing may be both smaller in size and lighter in weight. This makes the radial compressor particularly suited for utilization in compact vehicles. A radial compressor of the type described is disclosed in, for example, U.S. patent application Ser. No. 07/751,370 filed Aug. 28, 1991, entitled "Radial Compressor with Discharge Chamber Dams" and assigned to the assignee of the present invention.

While these piston type compressors provide a very effective way to compress and circulate the refrigerant fluid in a vehicle air conditioning system, an adverse side effect concerns delivery of the compressed gas in high pressure and noisy pulsations coincident with the discharge strokes of the pistons, rather than in a reasonably constant pressure and quiet condition. This shortcoming has to some extent been alleviated by the mixing chamber concept, but it has not been entirely solved. In addition to creating a rougher and noisier operating system, these discharge energy pulsations tend to lead to premature fatigue and failure of component parts throughout the air conditioning system, thereby diminishing its reliability.

Various attempts, other than providing mixing chambers, have been made to further reduce the effect of these energy pulsations in order to provide the desired smoother, quieter and more reliable compressor. One of the more successful approaches to date is disclosed in pending U.S. patent application Ser. No. 07/787,180 filed Nov. 4, 1991, entitled "Variable Discharge Flow Attenuation for Compressor" and assigned to the assignee of the present invention. In this approach, a rotary valve is positioned adjacent the discharge port of the discharge chamber in a wobble plate axial type compressor. This valve alternately covers and uncovers the discharge port of the compressor. The spaced variable flow orifices of the valve serve to attenuate the pulsations that occur during the operating cycle. Each flow orifice is preferably pear-shaped, and positioned with the necessary circumferential spacing for synchronization with the pumping stroke of the pistons within the compressor cylinders.

While the disclosed rotary valve is particularly effective in further attenuating pressure pulsations and thereby smoothing the operation and extending the service life of the compressor, this approach has a shortcoming. It is only readily integratable into a compressor of the axial type. Relatively extensive modifications are needed in a compressor of radial design in order to effectively utilize this concept.

Additionally, it must be noted that the already oversized axial-type compressor must actually be further enlarged to accommodate the rotary valve and the special nozzles that form the porting required. Accordingly, space limitations in a vehicle could even prevent the incorporation of an axial-type compressor modified to include this attenuator. Further, it should be noted that the rotary valve concept is not able to be easily retrofitted to previously designed and manufactured compressors. Similarly, the spaced dam attenuation concept in the discharge chamber of a radial compressor, described and claimed in the prior application Ser. No. 07/751,370 referenced above, is generally limited to incorporation in new radial compressors. Also, sound energy attenuation is limited since metal components are required. In view of this, it should be appreciated that a need exists for an alternative approach to provide attenuation of pressure/sound energy pulses of the refrigerant gas being discharged from the compressor of a vehicle air conditioning system.

SUMMARY OF THE INVENTION

Accordingly, it is a primary object of the present invention to provide an apparatus of relatively simple and inexpensive design for pressure/sound energy pulse attenuation that is substantially universal in its application and may be incorporated into piston-type compressors of new designs, or retrofitted into old designs.

It is another and related objective to provide an attenuator that can be easily installed by a simple connection into the discharge line adjacent the discharge port of any piston-type compressor, in order to provide efficient primary or secondary attenuation of pressure/sound energy pulsations.

Another object of the present invention is to provide an apparatus that more efficiently attenuates energy pulsations so as to achieve smoother, quieter operation and a longer air conditioning system service life. Accordingly, customer satisfaction is significantly enhanced.

Still another object of the present invention is to provide an apparatus for attenuating energy pulsations in the refrigerant gas being discharged from the discharge chamber of a piston-type compressor wherein a variable geometry profile is provided to the flow passage by a series of hydraulically or pneumatically formed dampening chambers. The constantly changing chambers function to modulate pressure and reduce sound energy peaks in the passage and thereby progressively flatten or deaden the same.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved pressure/sound energy pulsation attenuator is provided for use with a piston-type compressor of substantially any design. The apparatus includes an elastomeric body in the form of an elongated tube. This body is separated by annular dividers forming the chambers that are filled with damping fluid. Either liquid or pressurized gas is selected depending upon the operating characteristics, including the compressibility factor required to provide optimum damping performance for the particular compressor in question. The fluid-filled chambers are concentrically disposed about and define a sectionalized flow passage for the refrigerant gas.

As described in detail below, the attenuator is preferably mounted in the discharge line adjacent the discharge port of the compressor. In accordance with the present invention, reliable passive damping and smoothing of the pressure pulses and reducing the sound energy level is provided. This is accomplished through the provision of what is effectively a constantly changing flow passage that absorbs the pressure/sound pulsations to maintain a more constant and quieter downstream refrigerant gas flow in the discharge line. The chambers are positioned in series and the sections of flow passage are separated by central flow orifices of a constant area in the annular dividers. Together the sections/orifices serve to generate counteracting flow oscillations that propagate in a wave-like manner to efficiently cancel some of the absorbed peak energy, and thereby smooth the operation of the air conditioning system.

In the preferred embodiment, the annular dividers partition the fluid-filled body into three individual chambers and three passage sections. An array of damping tracks extending through the dividers provide fluid communication between the chambers. Preferably, the damping tracks restrict the fluid flow and enhance the damping effect of the constantly changing passage profile generated by the fluid chambers.

During compressor operation, the pressure/sound energy pulses of the refrigerant gas being discharged from the compressor normally fluctuate during a single operational cycle in a predictable and periodic fashion. More particularly, each pressure pulse is at a maximum or peak at the completion of each discharge stroke, and at a minimum between each discharge stroke. Upon reaching the first section of the flow passage of the attenuation apparatus of the present invention, each pulse at its peak strikes and momentarily compresses the internally bulging wall of the elastomeric body associated with the first in-line chamber. Accordingly, some damping fluid within the first chamber is forced through the damping track in the adjacent divider, and enters the second chamber, causing that chamber to expand. By positioning the fluid filled body within a rigid tubular housing that forms the exterior wall of the body, the resulting expansion in the chamber is forced inwardly. In passing through the damping tracks, some of the peak energy is absorbed and released as heat, so that vibration and noise is attenuated.

However, conservation of the energy of the pressurized gas is desirable, so that fluid pressure energy transfer, rather than energy loss, is important. This occurs in the downstream or second section of the passage that is now constricted. Preferably, at peak expansion, the cross-sectional area of the flow passage is closed by approximately 50%. For example, in a typical attenuator, the flow passage defined by the inward expansion of the second in-line chamber is reduced from substantially 0.5 square inch to 0.25 square inch. This constriction serves to retard and counteract the peak flow of refrigerant gas as it arrives in this downstream section of the passage, thus filling in the trough or valley in the pressure cycle.

Also, sound energy waves are absorbed by the elastomeric walls. The residual pressure/sound energy pulses bounce off the curved walls at random angles causing a high incidence of cancellation by interference from oppositely directed pulsations. In effect, this multifaceted action causes a substantial flattening or smoothing of the high energy pulses.

As the passage defined by the second in-line chamber restricts the flow, the refrigerant gas tends to push back against the interior wall of the second chamber, thus causing a compression of that chamber. This causes damping liquid within the second chamber to flow from the second chamber in opposite directions through the damping tracks in the dividers into both the first and third chambers. This results in the further modulation by absorption and transfer of additional energy of the pulsing flow. The expansion of the first and third dampening chambers squeezes the gas in between tending to force more mixing of the gas molecules of the high and low pressure segments, further adding to the smoothing action.

As the now significantly reduced pulse continues to move downstream, it must pass through the third in-line passage section, now formed by the expanded interior wall of the third chamber. As a result of the lowered pressure and deadened sound energy pulses striking and pressing against the bulging wall, the final dissipation of energy takes place. There is flow back through the damping tracks in the second annular divider, pressure and sound wave cancellation by intermixing and interference action and sound energy absorption by the elastomeric walls, thus resulting in nearly complete attenuation of the pulsation energy at this point. The first chamber is now ready to effectively begin attenuation of the next refrigerant gas discharge pulse, and the attenuation cycle repeats itself.

It should be appreciated that the discharge pulses occur at set intervals with the discharge of each piston from the compressor, and the spacing between the dividers is tuned to provide the best damping action. It is expected that in any given compressor, a predictable rhythm can be established by tuning that propagates a highly efficient wave-like motion for maximum attenuation, but with minimum refrigerant gas pressure energy loss. This occurs as the gas passes through the constantly changing profile passage defined by the series of first, second and third fluid-filled chambers.

As the damping fluid flows through the damping tracks back and forth to the adjoining chambers, a high dynamic rate dampening takes place and ideally serves to modulate the undesirable peaks of pressure energy. The fixed diameter flow orifices of the dividers help to produce the reverberating sound waves in the gas flow that tend to cancel each other and dissipate some of the sound energy. Each flow orifice of the dividers is preferably substantially equal to the cross-sectional area of the refrigerant gas discharge line. Accordingly, no unyielding restriction is provided relative to the discharge line that could cause back pressure and degrade compressor efficiency and performance. The orifices are lined with the molded elastomeric walls of the chambers to maximize the energy attenuation from the refrigerant gas pulsations without causing significant blocking action.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a longitudinal cross-sectional view of the apparatus of the present invention showing the in-line chambers forming a flow passage to attenuate gas pulses from the compressor of a vehicle air conditioning system;

FIG. 2 is a cross-sectional view along line 2—2 of FIG. 1;

FIG. 3a is a cross-sectional view of the apparatus of the present invention showing a refrigerant gas pressure pulse being received in the first section of the flow passage and sound energy pulses in the second section;

FIG. 3b is a view similar to FIG. 3a showing that pressure pulse positioned in the downstream or second section of the flow passage defined by the second chamber and sound energy pulses reflected to the first and third sections; and FIG. 3c is a view similar to FIGS. 3a and 3b showing the pressure pulse now dissipated in the flow passage formed by the third chamber, the sound energy pulses also now dissipated, and a second pressure pulse just entering the flow passage and defining the start of the next operational cycle.

Reference will now be made in detail to the present preferred embodiment of the invention, an example of which is illustrated in the accompanying drawing.

DETAILED DESCRIPTION OF THE INVENTION

Reference is now made to FIGS. 1 and 2 showing the attenuator 10 of the present invention for attenuating pressure/sound pulsations such as are commonly produced in refrigerant gas discharged from a piston-type compressor of a vehicle air conditioning system. As shown, the attenuator 10 is positioned in a discharge line L adjacent the discharge port of the compressor (not shown) that leads to the other components of the vehicle air conditioning system.

The attenuator 10 includes an elastomeric body 12. The body 12 may be produced in any appropriate manner from an elastomeric material, such as forming polychloroneoprene or NBR about an appropriately shaped mandrel. The elastomeric body 12 is generally annular and tubular in shape, and includes a sealed cavity filled with a damping fluid. Any known damping fluid may be utilized. This includes either a liquid or a gas. The fluid selected is a function of the required compressibility and other physical properties to provide the desired damping action. If a liquid is utilized, a common anti-freeze mixture is selected.

The body 12 also includes a central flow passage 14 for the refrigerant gas that extends along the longitudinal axis thereof. This passage 14 is connected in fluid communication with the discharge line L and defines the refrigerant gas flow path. The direction of flow of the refrigerant gas is shown by action arrows A.

As further shown in FIG. 1, the body 12 is molded to or adhesively connected to a pair of spaced, annular dividers formed from a rigid material, such as a suitable aluminum or other metal alloy. The dividers 16 are spaced so as to partition the cavity C into three chambers 18, 20, 22. These chambers 18, 20, 22 are serially aligned along and concentrically disposed about the refrigerant gas flow passage 14 so as to progressively attenuate pressure pulsations, in a manner described above and in greater detail below.

As also shown in FIGS. 1 and 2, an array of damping tracks 24 extend through the dividers 16. The damping tracks 24 provide fluid communication between the second chamber 20, and the first chamber 18 and the third chamber 22. Accordingly, as described in greater detail below, when one of the chambers 18, 20, 22 is compressed, damping fluid is forced from that chamber through the damping tracks 24 into the adjoining chamber or chambers. This causes the adjoining chamber(s) to expand. Since the elastomeric body 12 is confined within a rigid tubular housing or sleeve 25 (which is also preferably a metal alloy), the expansion is forced to assume an inward direction. Accordingly the inner annular wall of the expanded chamber(s) of the body 12 partially closes, and the corresponding section of the refrigerant gas flow passage 14 is constricted.

Operation of the apparatus 10 of the present invention will now be described in detail with reference to FIGS. 3a-3c.

As shown in FIG. 3a, as a first peak pressure pulsation P1 moves through the discharge line L into the first section of the passage 14, yieldingly restricted by the first or inlet chamber 18, an outwardly directed force is exerted (note pressure action arrows) that causes said first chamber to compress. As this compression occurs, some pressure energy from the pulsation P1 is absorbed in the bulging walls of the elastomeric body 12 and the damping fluid. The compression of the chamber 18 also results in some damping fluid being forced through the damping tracks 24 formed in the outer margins of the first in-line divider 16; i.e. fluid flows from the first chamber 18 into the second or downstream chamber 20 (see flow action arrows B). In order to accommodate the additional damping fluid received from the first chamber 18, the second chamber 20 expands inwardly constricting the refrigerant gas flow passage 14. As shown in the figure, the passage 14 is actually restricted approximately 50%. In a preferred embodiment for a conventional compressor of the type described, this can be from a cross-sectional area of one-half square inch to a cross-sectional area of one-fourth square inch at its points of maximum expansion. Simultaneously with the pressure pulse attenuation, sound energy pulses $S_1$ and $S_2$ are partially absorbed and reflected, as shown by the dashed line arrows.

Following the refrigerant gas pulsation P1 as it flows through the passage 14, it now passes from the first chamber into the area of the second chamber (see FIG. 3b) through flow orifice 26. Preferably, the cross-sectional area of the orifice 26 is substantially the same as the cross-sectional area of the discharge line L. Accordingly, there is no unyielding restriction of refrigerant gas flow. By avoiding the provision of an unyielding restriction, any significant build-up in back pressure of the refrigerant gas is avoided, and the desired operating efficiency of the compressor is maintained.

In the second section of the passage 14, the pulsation P1 engages the inwardly expanded wall of the second chamber 20, thereby further retarding the peak flow of the refrigerant gas. Further, the pulsation P1 exerts an outwardly directed force against the yielding inner wall of the second chamber 20 causing the chamber to begin compressing (note pressure action arrows). As the second chamber 20 compresses, some additional energy from the pulsation P1 is absorbed and damping fluid is forced through the damping tracks 24 in both the dividers 16 into the first or inlet chamber 18 and third or outlet chamber 22 (see flow action arrows C). As the damping fluid flows through the tracks 24, significant dissipation of the pulsation energy occurs.

Of course, the chambers 18, 22 are simultaneously caused to expand inwardly in order to accommodate the flow of damping fluid. As a result, the pulsation P1 in this second section of the passage 14 is squeezed to promote mixing and swirling of the high pressure and low pressure segments of the flow that smooths the pulsation energy without significant energy loss. At the same time, the sound energy pulses $S_1$, $S_2$ undergo further attenuation. More particularly, some of the sound energy is absorbed by the inwardly expanding elastomeric walls of the first and third chambers 18, 22. Further, the residual energy of the pulses $S_1$, $S_2$ is reflected from these curved walls at random angles (note dashed line arrows). This causes a high incidence of collisions between the sound energy pulses and thus, cancellation by interference of oppositely directed pulses. Accordingly, a further substantial flattening or smoothing is achieved.

Next, the pulsation P1 passes through the flow orifice 26 of the second divider 16 and enters the third section of the passage 14 restricted by the bulging annular wall of the third chamber 22 (see FIG. 3c). There, the already significantly attenuated pressure pulsation P1 and sound wave pulses $S_1$, $S_2$ are again attenuated, and substantially all of the residual pulsation energy is now dampened to minimize noise and smooth compressor operation. More particularly, the final stage of the pressure and sound wave attenuation and cancellation takes place by flow of fluid through the tracks 24 (note flow action arrows D) and intermixing and interference action, as well as sound energy absorption by the elastomeric walls. At about the same time, another pressure pulsation $P_2$ and attendant sound wave pulses are entering the first section of the flow passage 14, and the beneficial attenuation process repeats itself. As indicated above, this description provides the best understanding of the various damping forces and actions as understood at the present time. There are variations expected dependent on the many parameters of the particular compressor and refrigerant flow involved, and the tuning of the attenuator 10 to best accommodate the same. However, the basic structure and operation, as set forth in the claims, remain the same.

In summary, numerous benefits result from employing the concepts of the present invention. The attenuator 10 provides serially aligned damping chambers 18, 20, 22 that are concentrically disposed about the refrigerant gas flow passage 14. Pressure and sound wave pulsations $P_1$, $P_2$, $S_1$, $S_2$ are effectively dampened so as to not only smooth, but quiet the operation of the air conditioning system. The in-line flow sections defined by the chambers 18, 20, 22 and the connecting flow orifices 26 function to propagate a reverberating wave pattern that adds significantly to the smoothing action. As will be realized, this is advantageously done in a passive system requiring no monitoring, and no mechanical or electrical controls. Additionally, it should be appreciated that the attenuator 10 is relatively inexpensive to fabricate and, advantageously, simple to install. It may also be retrofitted onto vehicles and provides a relatively simple and inexpensive means for smoothing compressor operation and suppressing noise, as either a primary or secondary attenuator.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. An apparatus for attenuating refrigerant gas pressure and sound energy pulsations emanating from a piston-type refrigerant compressor, comprising:
   an annular elastomeric, fluid-filled body defining a central refrigerant gas flow passage;
   divider means for said fluid-filled body to form multiple chambers; and
   damping track means extending through said divider means providing fluid communication between said chambers;
   whereby said pressure and sound energy pulses are dampened to smooth and quiet the operation of the compressor by fluid flow between said chambers.

2. An apparatus for attenuating refrigerant gas pressure and sound energy pulsations emanating from a piston-type refrigerant compressor, comprising:
   an annular elastomeric, fluid-filled body defining a central refrigerant gas flow passage;
   a rigid tubular housing supporting said fluid-filled body;
   divider means for said fluid-filled body to form three in-line chambers, said divider means including a pair of annular dividers forming said chambers;
   damping track means extending through each of said annular dividers providing fluid communication between said chambers;
   whereby said pressure and sound energy pulses are dampened to smooth and quiet the operation of the compressor by fluid flow between said chambers.

3. An apparatus for mounting in the discharge line to attenuate refrigerant gas pressure and sound energy pulsations emanating from a piston-type refrigerant compressor, comprising:
   an annular elastomeric, fluid-filled body defining a central refrigerant gas flow passage;
   a rigid tubular housing supporting said fluid-filled body;
   a pair of annular dividers partitioning said fluid-filled body into three chambers in series, said chambers being concentrically disposed about said refrigerant gas flow passage, said annular dividers each including a flow orifice having a fixed cross-sectional area substantially equal to the cross-sectional area of said discharge line; and
   damping track means extending through said dividers providing fluid communication between said chambers;
   whereby said pressure and sound energy pulses are dampened to smooth and quiet the operation of the compressor by fluid flow between said chambers.

4. The attenuator apparatus set forth in claim 3, wherein said body is formed into bulging sections directed inwardly and when expanded close said refrigerant gas flow passage by approximately 50%.

* * * * *